(12) United States Patent
Dailey

(10) Patent No.: US 7,640,087 B1
(45) Date of Patent: Dec. 29, 2009

(54) SHUNT FOR CONTROL NETWORK IN LIGHT DUTY MOTOR VEHICLE

(75) Inventor: Joseph Charles Dailey, Phoenix, AZ (US)

(73) Assignee: Vantage Mobility International, Phoenix, AZ (US)

( * ) Notice: Subject to any disclaimer, the term of this patent is extended or adjusted under 35 U.S.C. 154(b) by 612 days.

(21) Appl. No.: 11/521,531

(22) Filed: Sep. 13, 2006

(51) Int. Cl.
*B60L 1/00* (2006.01)
(52) U.S. Cl. .................................. 701/36; 307/10.1
(58) Field of Classification Search ................ None
See application file for complete search history.

(56) References Cited

U.S. PATENT DOCUMENTS 5,696,409 A * 12/1997 Handman et al. ......... 307/10.1
5,804,887 A * 9/1998 Holzapfel et al. ......... 307/10.1
6,255,790 B1 * 7/2001 Popp et al. .................. 318/280
6,279,981 B1 * 8/2001 Mesnage .................. 296/65.03

* cited by examiner

*Primary Examiner*—Michael J. Zanelli
(74) *Attorney, Agent, or Firm*—Paul F. Wille

(57) ABSTRACT

A programmed microprocessor has a learning mode of operation wherein data to and from a circuit coupled to a wiring harness in a vehicle is stored by the microprocessor. After the learning mode is completed, removal of the circuit does not cause an error condition because appropriate data is supplied instead by the microprocessor. A sleep mode of operation prevents the microprocessor from interfering with the operation of the circuit when the circuit and the microprocessor are coupled to the wiring harness.

10 Claims, 3 Drawing Sheets

SHUNT FOR CONTROL NETWORK IN LIGHT DUTY MOTOR VEHICLE

BACKGROUND OF THE INVENTION

This invention relates to the control network in a light duty motor vehicle, such as a van, minivan, or sport utility vehicle, and, in particular, to a shunt for emulating a removed front seat.

Modern automobiles are endowed with a plurality of computers and sensors to provide convenience and safety for drivers and passengers. These computers are distributed throughout the vehicle communicate with each other via one or more networks. For example, a computer controlling the instrument panel may sense that the vehicle is moving rapidly enough to lock the doors and will signal the appropriate computer that it is time to lock the doors.

Some of the computers provide protection and safety for the driver and passenger. A computer determines, for example, whether the seat belt has been fastened, whether or not there is a person in the passenger seat, and the weight of the person in the passenger seat. Each of these parameters or measurements is performed by sensors located in or near the seat.

The amount of data that is generated and communicated is greater for a passenger's seat than for a driver's seat. If a driver inserts a key into the ignition, then the appropriate air bags will be enabled and the seat belt will be checked for being buckled. However, the presence of mass or a live body in the passenger seat is ambiguous. The passenger side air bag should only be activated if there is a person in the passenger seat and only if that person has a height and weight greater than certain minimums. Hence, the number and sophistication of sensors in the passenger's seat are usually greater than those for the driver's seat.

Typically, sensors, and sometimes their network interfaces, are built into the seat itself and coupled to other computers within the vehicle. If a front seat is removed, the absence of the sensors will be noted by other computers in the vehicle and error signals (visual and audible) will be generated as long as the sensors are missing. One must do something to suppress the error signals without compromising the safety of the vehicle.

Driver side sensors can be transferred to a new seat or passive devices can be added to emulate the driver's seat to prevent detecting false errors. For the driver's seat, the typical OEM (original equipment manufacturer) sensors are the seat belt buckle, air bag sensor, and seat position. These sensors can usually be replaced by passive networks of resistors and/or capacitors to suppress the vehicle warning system. The passive network can often be contained in a small module that plugs into the OEM wiring harness ending at the driver's seat.

The passenger seat, on the other hand, typically has sensors for the seat belt, air bag, adult passenger detection, and weight sensor. The first two sensors are coupled to computers under the seat, while the last two sensors are coupled by network to other computers. The first two sensors can be replaced with passive networks but the last two cannot. The data stream from the passenger sensor and weight sensor must represent occupancy as if the seat were still in place. The problem is further complicated by the fact that some manufacturers uniquely identify each seat with a code that also must be received on a regular basis by other computers in one or more networks. That is, not only must the data be present but it must be present on the correct network at the correct time and preceded by the correct identification code.

For aftermarket outfitters modifying light duty motor vehicles, the problem of removing a front passenger seat, or otherwise removing sensors from a vehicle, is compounded by a lack of information from an OEM, generally because of concern for product liability in a judicial system where outcome can be very unpredictable.

In digital systems, binary data can only represent one of three things: data, an address, or an instruction. This is the information that is carried on a serial data bus or network as used in modern vehicles. The binary data is sent along the serial bus in a format specified by one organization or another. The J1850 standard is from the Society of Automotive Engineers (SAE). Another standard is ISO9141. Control signals are not on the serial bus, at least not directly. Control information can be passed along a network as an instruction to be executed but the wire, the physical bus itself, cannot also be a control line. Conversely, a control line is not a data bus. Collectively, control lines, lines supplying power or ground, and data buses are referred to as the "wiring harness" of a vehicle.

As used herein, no distinction is made among the terms "computer," "microprocessor," and "microcontroller." Similarly, a microprocessor can be a single integrated circuit or a "chip set," having plural integrated circuits. Microprocessors are produced in a variety of capabilities and one of ordinary skill in the art can readily choose an appropriate device. Most manufacturers produce guides for choosing a device.

In view of the foregoing, it is therefore an object of the invention to provide a shunt for emulating circuitry that has been disconnected from the wiring harness of a light duty motor vehicle.

Another object of the invention is to provide a shunt that can emulate a circuit even when the meaning of signals within the circuit is not understood.

A further object of the invention is to provide a shunt that can be programmed in the vehicle for which it is to be used.

Another object of the invention is to provide a shunt that can adapt to identification or other unique codes circulating in a vehicle control system.

A further object of the invention is to provide a shunt that can be left coupled in parallel with the circuit it is to replace without interfering with the operation of that circuit.

SUMMARY OF THE INVENTION

The foregoing objects are achieved in this invention in which a programmed microprocessor has a learning mode of operation wherein data to and from a circuit coupled to a wiring harness in a vehicle is stored by the microprocessor. After the learning mode is completed, removal of the circuit does not cause an error condition because appropriate data is supplied instead by the microprocessor. A sleep mode of operation prevents the microprocessor from interfering with the operation of the circuit when the circuit and the microprocessor are coupled to the wiring harness.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
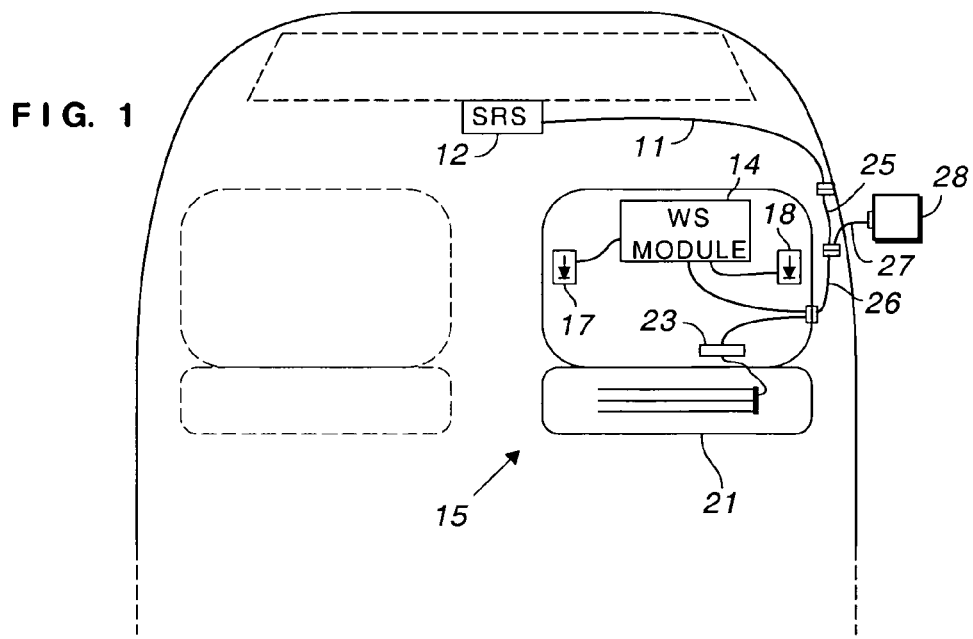
FIG. 1 illustrates a portion of the wiring harness in a light duty motor vehicle, including a shunt constructed in accordance with the invention.

FIG. 1 illustrates the front end of a light duty motor vehicle, such as a minivan, and a portion of the wiring harness in such a vehicle. Harness 11 includes supplemental restraint system (SRS-air bag) module 12 and weight sensing module 14. Weight sensing module 14 is located under front seat 15 and is coupled to several force sensors, such as sensors 17 and 18. By interpreting the signals from the force sensors, module 14 can determine the weight of the mass resting on front seat 15.

Occupant detection system 21 typically includes capacitive sensors located in the back of seat 15 and is coupled to wiring harness 11 by module 23. Wiring harness 11 includes various connectors that separate the harness into segments to facilitate assembly or repair. In accordance with one aspect of the invention, the segment between the seat and the SRS module is replaced with a section of harness including two segments, 25 and 26. Segment 27 couples shunt 28 to wiring harness 11.

Figure 2:
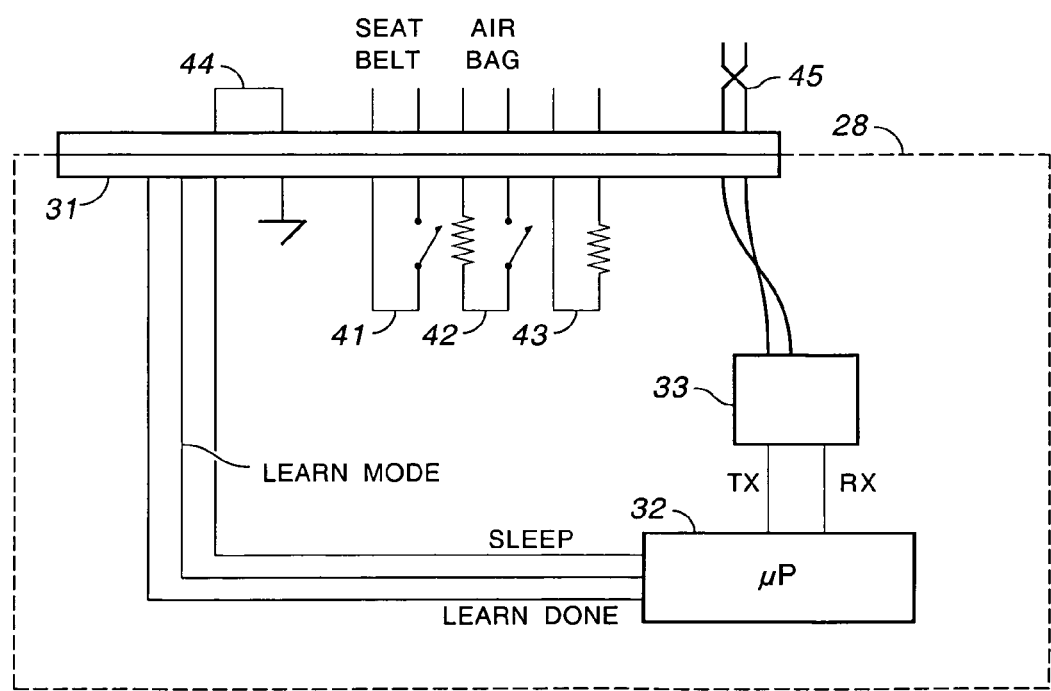
FIG. 2 is a block diagram illustrating a shunt constructed in accordance with a preferred embodiment of the invention.

FIG. 2 illustrates a shunt constructed in accordance with a preferred embodiment of the invention. Connector 31 couples microprocessor 32 to segment 27 (FIG. 1). As described in the Background, some portions of the OEM system can be emulated with passive components. Circuit 41 replaces the buckle switch. Circuit 41 includes a switch in the event that it becomes necessary to indicate a closed buckle. For example, if the front passenger area is modified to accommodate a wheelchair or other device for carrying a person of limited mobility. Circuit 42 emulates an airbag sensor (indicates the presence of a seat to the SRS controller). Circuit 43 represents other circuits that can be emulated with passive components.

In accordance with the invention, microprocessor 32 is coupled to the network portion of harness 11 (FIG. 1) by transceiver 33. Microprocessor 32 also has control or sense lines coupled to harness 11. As illustrated in FIG. 2, serial bus 45 is a two wire bus, shown as a twisted pair of wires. The serial bus can be a single wire instead.

Circuit 44 is a ground loop or short that exists in the OEM harness and is used by microprocessor 32 as an indication that a seat is installed. In this case, microprocessor enters a sleep mode and the electronics in the passenger seat modules operate normally. There is no possibility of interference from shunt 28. This provides a significant advantage for the vehicle owner because the vehicle can be reconfigured at will to suit the passengers by installing or removing the seat and connecting or disconnecting the wiring harness. For wiring harnesses in other make or model vehicles, a direct connection to ground could be utilized instead if there is no existing loop.

When the ignition is turned on, SRS module 12 sends out a code, an initiation request, to the passenger seat. Assuming that weight sensor module 14 is addressed, module 14 responds with a serial number, which is checked by SRS module 12. SRS module 12 then sends an initiation request to occupant detection module 23, which responds with a serial number. Assuming that the serial numbers are correct, SRS module 12 then enters a loop in which weight and occupant data are repeatedly requested from and sent by the appropriate module. This process is performed in a Honda Odyssey minivan for model year 2006. Other makes, models, or years could have a different sequence. The serial numbers are not revealed by the OEM. Thus, the number of possibilities that must be accommodated is significant.

In accordance with the invention, microprocessor 32 enters a "learn" mode in which the microprocessor monitors data bus 45 and memorizes the signals and the responses to the various signals. If the seat is empty and the correct response is learned, such is usually sufficient. The standards for the serial bus define the components (e.g. header, address, data, checksum) of a message, simplifying the learning process somewhat. That is, the microprocessor knows (is programmed) where to look for content in the data stream and does not memorize or store needless or repetitious data.

During the learning process, various conditions can be imposed; e.g. the front passenger seat is left empty, an adult sits in the seat, a small person sits in the seat, or a bag of goods is placed on the front passenger seat. The various conditions, depending upon year, make, and model of the vehicle, may not be necessary. Imposing various conditions provides reassurance during the development of a shunt that the system is learning correctly even if the meaning of the signals is not known. It is another advantage of the invention that the meaning of the signals need not be known. The shunt merely provides a sufficient response to obviate a false positive in the error detection software of an OEM module. The meaning of that response need not be known.

Figure 3:
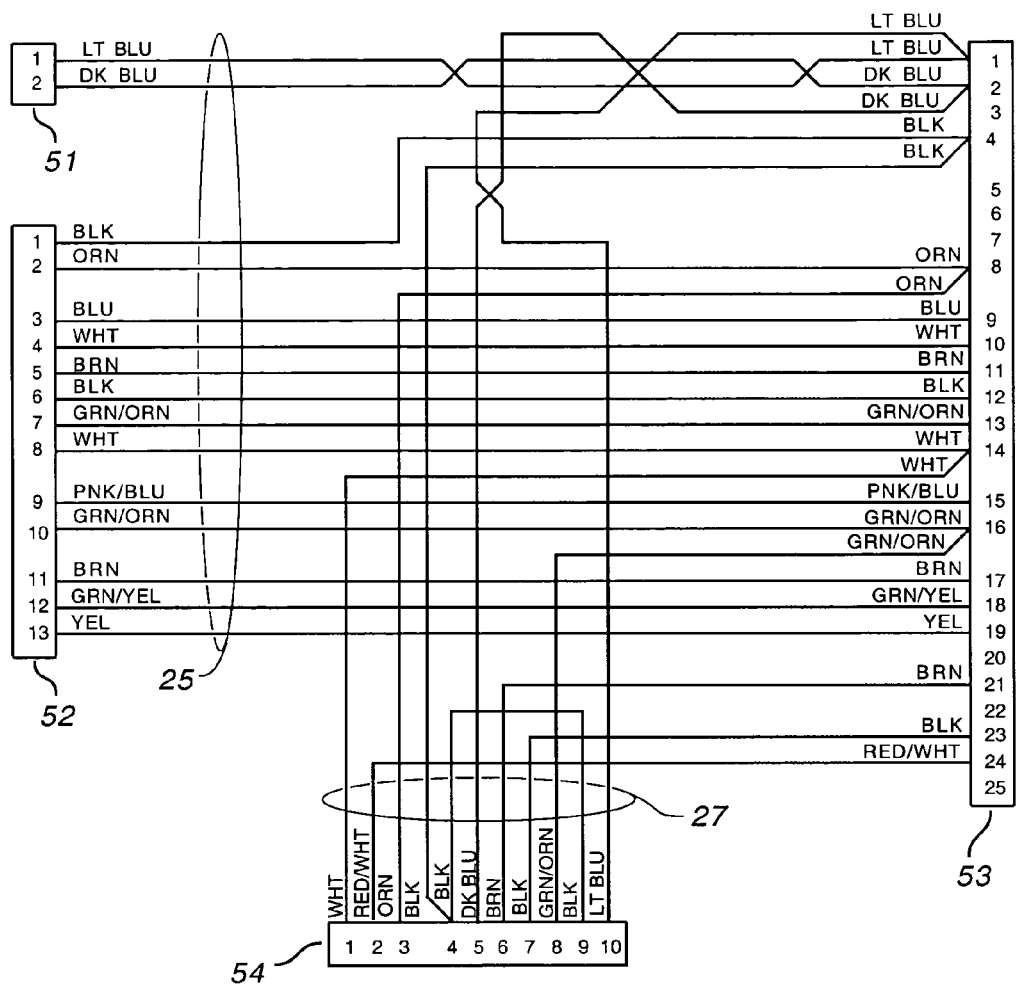
FIG. 3 is a wiring diagram of a Y-harness used for coupling the shunt to the wiring harness of a vehicle.

FIG. 3 is a wiring diagram of the Y-harness used for coupling the shunt to the wiring harness of a vehicle. Connectors 51 and 52 couple the Y-harness to harness 11 (FIG. 1). Connector 54 couples the Y-harness to shunt 28 (FIG. 1). Connector 53 connects to connector 56 (FIG. 4) or 61 (FIG. 5). The harness illustrated in FIG. 4 couples to seat 15 by means of connectors 57 and 58. The harness illustrated in FIG. 5 couples to seat harness 26 by means of connectors 62 and 56.

Figure 6:
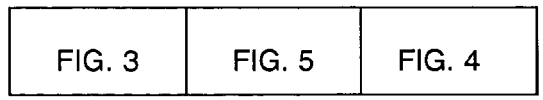
FIG. 6 is a block diagram of the connections of the harness segments during learn mode.
Figure 4:
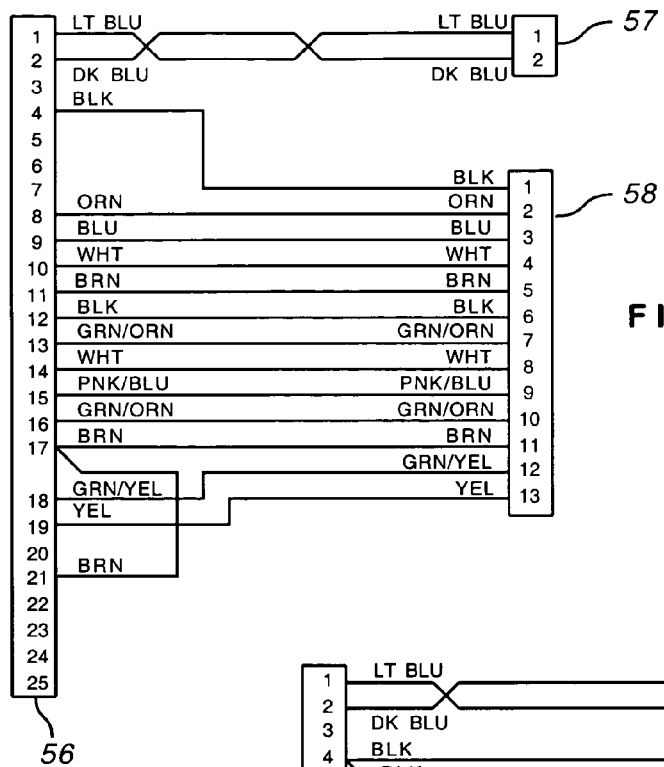
FIG. 4 is a wiring diagram of the seat harness used to couple the seat modules to the Y-harness.
Figure 5:
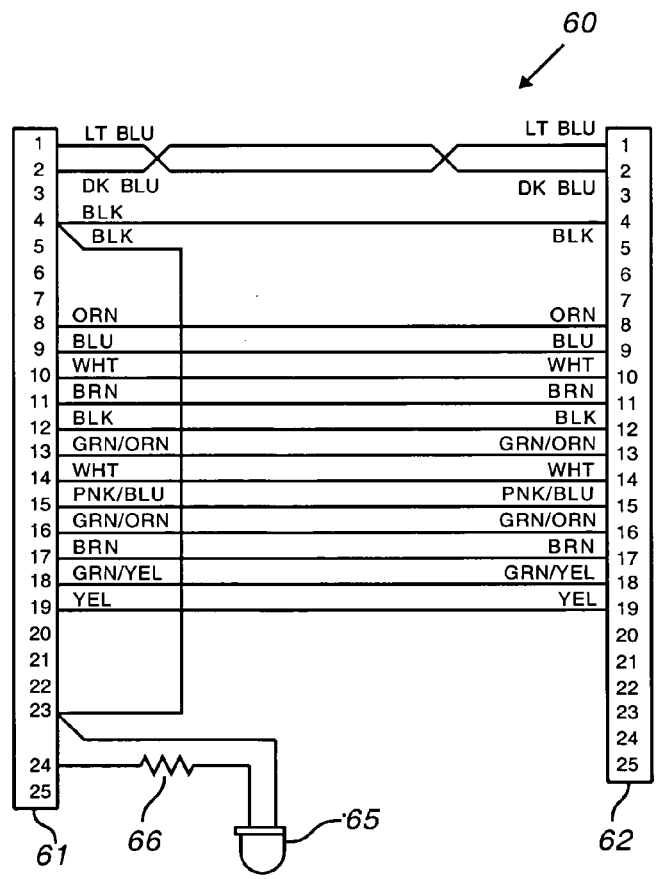
FIG. 5 is a wiring diagram of the "learning" harness used to couple the seat harness to the Y-harness and switch the shunt into learning mode.

FIG. 5 illustrates the "learning" harness that is connected between the harness of FIG. 4 and the Y-harness illustrated in FIG. 3. The connections for the learning mode are illustrated in FIG. 6. In FIG. 4, pin 21 (BRN) is an intermittent ground. If a seat is connected, this ground is detected by the shunt and microprocessor 32 (FIG. 2) enters a sleep mode. In learning mode, the intermittent ground is switched from one pin to another pin when passed to the shunt. Pins 21 in connectors 61 and 62 are not connected. Pin 23 in connector 61 is grounded. Thus, the shunt is active and in learning mode.

During learn mode, signals on a single wire serial bus, pin 16 (GRN/ORN), are monitored as described above for twisted pair 45 (FIG. 2). Learn mode is completed when the responses to all commands have been stored. When learn mode is completed, intermittent supply line 24 is activated, supplying current to light emitting diode 65 through resistor 66. This signals the installer that the shunt is ready for use. The installer removes harness 60 and connects connector 56 (FIG. 4) to connector 53 (FIG. 3).

When the shunt learns the codes necessary to emulate the OEM data, the learning mode ends. The duration of the learning mode depends upon how long it takes for the OEM module to send and receive the required data among OEM modules 12, 14, and 23 and the time it takes for microprocessor 32 to store that date in memory. For example, if the ignition is turned on and simply left on, the shunt will end learning mode in approximately 30-40 seconds and turn on LED 65.

The invention thus provides a shunt for emulating circuitry that has been disconnected from the wiring harness of a light duty motor vehicle. The shunt can emulate the circuit even when the meaning of the signals is not understood. The shunt can be programmed in the vehicle for which it is to be used and adapt to identification or other unique codes circulating in networks of the vehicle. The shunt can be left coupled in parallel with the circuit it is to replace without interfering with the operation of that circuit.

Having thus described the invention, it will be apparent to those of skill in the art that various modifications can be made within the scope of the invention. For example, although described in the context of a front passenger seat, a shunt can be used to emulate any circuit coupled to a network in a vehicle, such as but not limited to, circuits associated with other seating, doors, tailgates, sliding roof panels, or lift gates. A "sleep" mode is any mode of operation in which the microprocessor is prevented from providing signals to the network when a "sleep" signal is sent to the microprocessor. Whether such mode is effected as sleep, power down, enable/disable, masking interrupts, or other means is immaterial. The action need not be taken at the microprocessor. For example, transceiver 33 could be disabled instead.

What is claimed as the invention is:

1. In a light duty motor vehicle having a wiring harness including at least one network and an electronic circuit coupled to that network, a shunt for emulating the electronic circuit, said shunt comprising:
   a programmed microprocessor;
   an interface circuit coupled to the microprocessor and to said network;
   said microprocessor having a first mode of operation wherein date from said network is stored by the microprocessor and a second mode of operation, whereby removal of the electronic circuit does not cause an error condition on the network because appropriate data is supplied instead by the microprocessor during the second mode of operation.

2. The vehicle as set forth in claim 1 in which said microprocessor is prevented from supplying data to the network when said electronic circuit is connected to said network.

3. The vehicle as set forth in claim 2 wherein said microprocessor has a sleep mode of operation.

4. The vehicle as set forth in claim 1, further including a connector for coupling the shunt to the wiring harness, said connector including an intermittent ground terminal.

5. The vehicle as set forth in claim 4 wherein said microprocessor has a sleep mode of operation and said intermittent ground connection controls said sleep mode.

6. The vehicle as set forth in claim 1, further including a connector for coupling the shunt to the wiring harness, said connector including an intermittent supply terminal.

7. The vehicle as set forth in claim 6 and further including a light emitting diode, wherein said microprocessor indicates the end of the first mode by turning on said light emitting diode.

8. The vehicle as set forth in claim 1, further including a Y-harness for coupling said shunt to said wiring harness.

9. The vehicle as set forth in claim 8 and further including a connector for coupling the shunt to the Y-harness, said connector including an intermittent ground terminal.

10. The vehicle as set forth in claim 9 including a section of harness coupled between said connector and said Y-harness, wherein said section of harness does not couple said intermittent ground terminal to said Y-harness, thereby enabling said microprocessor to enter said first mode.

* * * * *